United States Patent
Schultheiss et al.

[11] Patent Number: 5,978,445
[45] Date of Patent: Nov. 2, 1999

[54] SPECTROMETER FOR X-RADIATION

[75] Inventors: Christoph Schultheiss, Karlsruhe; Waldemar Jakobi, deceased, late of Karlsruhe, both of Germany, by Alla Jakobi, Anna Jakobi, Helena Jakobi, heir/legal representatives

[73] Assignee: Forschungszentrum Karlsruhe GmbH, Karlsruhe, Germany

[21] Appl. No.: 08/666,443

[22] PCT Filed: Sep. 23, 1995

[86] PCT No.: PCT/EP95/03775

§ 371 Date: Mar. 19, 1997

§ 102(e) Date: Mar. 19, 1997

[87] PCT Pub. No.: WO96/13734

PCT Pub. Date: May 9, 1996

[30] Foreign Application Priority Data

Oct. 27, 1994 [DE] Germany ............ 44 38 361

[51] Int. Cl.[6] .................................... G01T 1/36
[52] U.S. Cl. .................. 378/82; 378/84; 378/145
[58] Field of Search ............... 378/82, 84, 85, 378/145

[56] References Cited

U.S. PATENT DOCUMENTS 5,192,869  3/1993  Kumakhov ................ 378/84

*Primary Examiner*—Craig E. Church
*Attorney, Agent, or Firm*—Venable; Norman N. Kunitz

[57] ABSTRACT

The invention relates to a spectrometer for X-radiation, including a disk which is impervious to the radiation and which has a first and a second surface provided with a plurality of channels or bores measuring a maximum of 50 $\mu$m. The bores are disposed in such a manner that they extend from the first to the second disk surface and their extensions point toward a common line or a common point, with the common line or common point being located opposite the second surface. Also provided is a device with the aid of which the arching of the disk can be altered in such a way that the distance of the common line or common point from the concave surface changes.

2 Claims, 4 Drawing Sheets

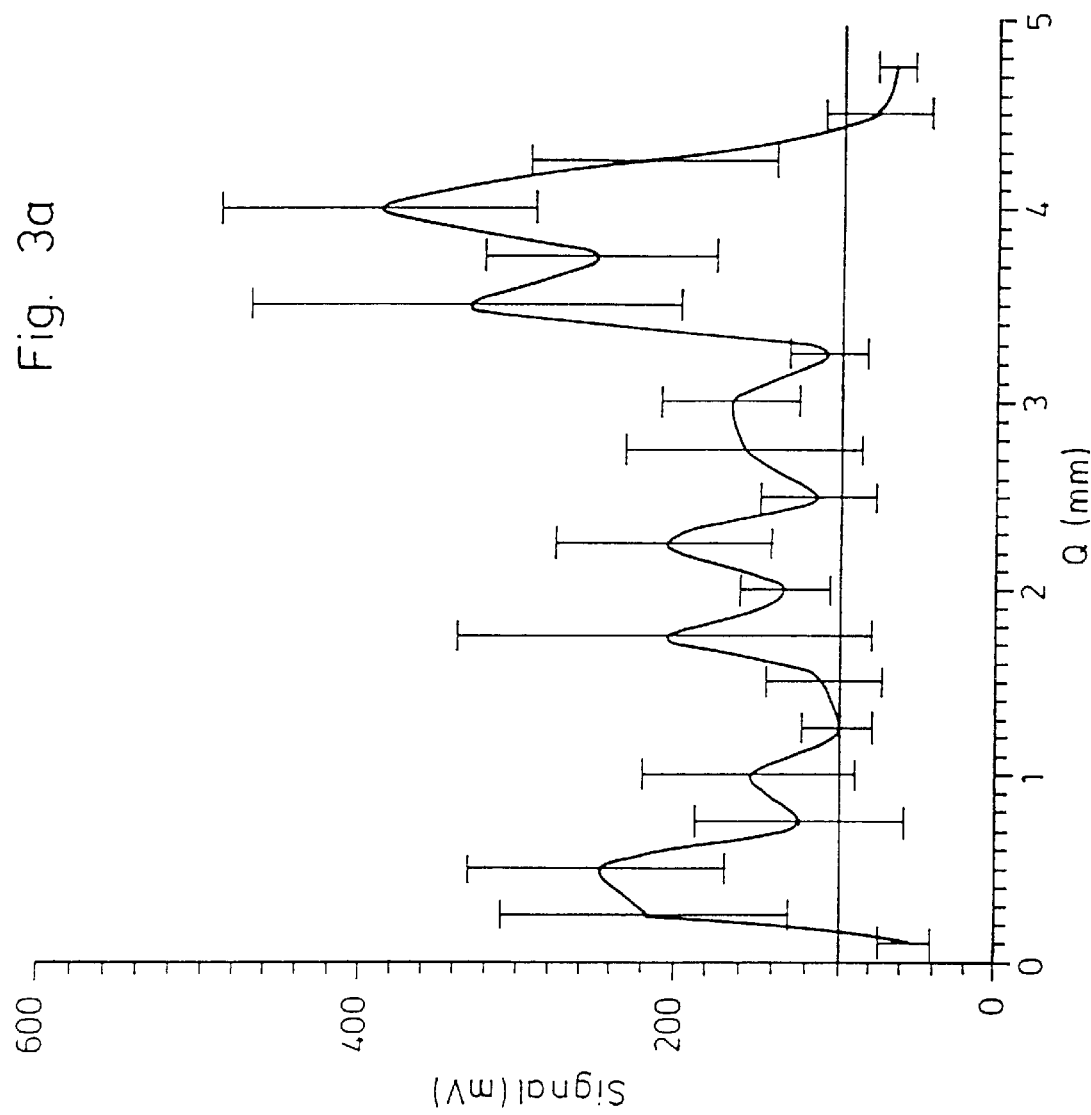

SPECTROMETER FOR X-RADIATION

BACKGROUND OF THE INVENTION

The invention relates to a spectrometer for X-radiation.

It is known from physics textbooks (e.g. Christian Gerthsen: "Physik [Physics]," Ninth Edition, Springer-Verlag, Berlin, Heidelberg, New York (1966), pp. 404 et seq.) that an X-ray beam (wavelength approximately 10–8 cm) is reflected with diffraction upon impact on a ruled grating (e.g. 200 lines/mm) at a flat angle (e.g. 10'). It is also known that radiation diffracts as it passes through a screen, with the diffraction being a function of the radiation wavelength.

A spectrometer for X-radiation comprising a disk which is impervious to X-radiation and is %provided with a plurality of channels is known from Rev. Sci. Instrum. 58 (1), 1987, pp. 43–44.

Known from Nuclear Instruments and Methods in Physics Research B82, 1993, pp. 121–124 is a spectrometer for X-radiation that comprises an arched disk which is impervious to X-radiation and has a convex and a concave surface provided with a plurality of channels (capillaries) that point toward a common point.

SUMMARY OF THE INVENTION

It is the object of the invention to propose a further spectrometer with the aid of which a spectrum of X-radiation is attained.

In accordance with the invention, the object is accomplished by providing a spectrometer having an arched disk comprised of a material impervious to X-radiation. The disc has a convex and a concave surface, and has a plurality of through bores. Each bore extends from the convex to the concave surface and has a maximum diameter of 50 $\mu$m. Each bore further has a longitudinal axis that essentially points toward one of a common line and common point located opposite the concave surface. Means are provided that engage the arched disc for altering an arching of the disc so that a distance of the common line or common point from the concave surface is changed.

A component of the spectrometer according to the invention is an arched disk which is impervious per se to X-radiation and includes a plurality of channels or bores therethrough, each having a maximum diameter of 50 $\mu$m and disposed in such a way that they point toward a common line or common point. Because of the arching, the disk has a concave and a convex surface. The common line or common point is located opposite the concave surface of the disk. The thickness of the disk can be less than 1 cm, and even less than 1 mm with soft X-radiation.

Surprisingly, it has been seen that the channels of the known disk are only permeable to a single wavelength range of a continuous X-radiation. Through which wavelength range of the continuous X-radiation the spectrometer passes is a function of the degree of arching of the spectrometer. If a parallel X-ray beam having a continuous wavelength impacts on the convex surface of the disk, the disk, having predetermined arching, is only permeable to radiation of a specific wavelength range, while the other wavelength ranges are absorbed. The radiation of the wavelength range that penetrates the disk is focussed on the common line or in the common point. The present invention proposes providing an additional device with the aid of which the arching of the disk can be altered which offers the possibility of focussing consecutive individual wavelength ranges on the concave side of the arched disk.

The disk material should be impervious to X-radiation. In general, this condition is met by glass. Plastics such as polycarbonate are suitable for soft X-radiation.

In a first embodiment, the disk can be arched such that it forms part of the jacket surface of a cylinder, so that its cross-section represents a portion of a circle, for example a third or a quarter of a circle. In this case, the channels point toward a common line, namely the axis of the cylinder, and are disposed perpendicularly to the disk. In this case the device effects a change in the cylinder diameter. In a second, improved embodiment, the disk is arched such that all of the channels point toward a common point, the focal point. In this case the concave side forms a radially-symmetrical recess, while the convex side represents a corresponding elevation. Again, the channels are disposed perpendicularly to a surface of the disk. The extent of the depression is set by the device.

In order to attain the spectrum of a continuous X-radiation, the arching of the disk must be altered so that a different wavelength range can be detected on the concave side. The alteration of the arching is effected with the aid of the device in such a way that the common line or common point is displaced. The displacement takes place along a line formed by the normal to the surface of the tangents at the vertex point or at the vertex line of the concave surface of the disk.

In both of the cited embodiments, the disk is preferably arched in such a way that the tangents at its edge form an angle between 3° and 20° with the tangential surface at its vertex. The measurement of this angle was derived for a polycarbonate spectrometer.

The number of channels and their diameter determines the permeability of the spectrometer to the radiation to be focussed. The absorption of radiation incident on the spectrometer is a function of the total ratio of the surfaces of the open and closed regions. The higher the total surface of the channel entrance openings and thus the open regions, the more permeable the spectrometer. The channels should have a diameter of less than 50 $\mu$m. It appears that smaller diameters are better suited, for example of approximately 10 $\mu$m and less. Optimum properties are anticipated with a channel diameter of less than 1 $\mu$m, for example 0.1 $\mu$m. In this instance, the number of channels must be increased correspondingly in order to reduce the absorption of the radiation by the disk material, the material being impervious to the beam.

The spectrometer according to the invention can be manufactured starting with a planar disk which is impervious to X-radiation. The planar disk is provided with a plurality of throughgoing channels which extend parallel to each other and perpendicular to the plane of the planar disk, and have a maximum diameter of 50 $\mu$m. A plurality of very fine channels can be manufactured by the exposure of the planar disk to a parallel ion beam impacting on the planar disk, which beam penetrates the disk. The arrangement of the individual channels is arbitrary; no specific pattern need be predetermined.

On the other hand, it has been seen that planar disks having a plurality of channels which extend parallel to one another and perpendicular to the disk plane are already commercially available for the purpose of filtration of liquids. Proven suitable for the manufacture of a spectrometer for soft X-radiation are filter wafers of polycarbonate, for example, having a plurality of pores, as sold in specialty shops under the brand name "Nucleopore® Polycarbonate Membrane." They measure approximately 4.5 cm in diameter and are approximately 0.01 mm thick. They include throughgoing pores having a pore diameter of 12 μm to 0.015 μm, and a pore density of $10^5$ to $6·10^8$ pores/cm².

The planar disk is arched in the described manner with the aid of a device, as described in the following paragraph with the degree of arching being adjustable.

If the above-cited filter wafers are intended to be used as the spectrometer, they can be inserted into an opening of a container that can be evacuated, after which the container is permanently evacuated by a pump. With sufficient pump power, the filter wafer arches symmetrically in the direction of the interior of the container, with the degree of arching being dependent on the pump power. If the spectrometer is not to have a focal point, but a focal "line," in flexible planar disks it is sufficient to clamp the planar disk in a fixing and clamping apparatus in such a way that it forms a portion of the jacket surface of a cylinder, the cylinder diameter being adjustable.

BRIEF DESCRIPTION OF THE DRAWINGS

The invention is described in detail below in conjunction with the drawing figures.

Shown are in:

FIGS. 3a and 3b intensity diagrams.

DETAILED DESCRIPTION OF THE INVENTION

Figure 1:
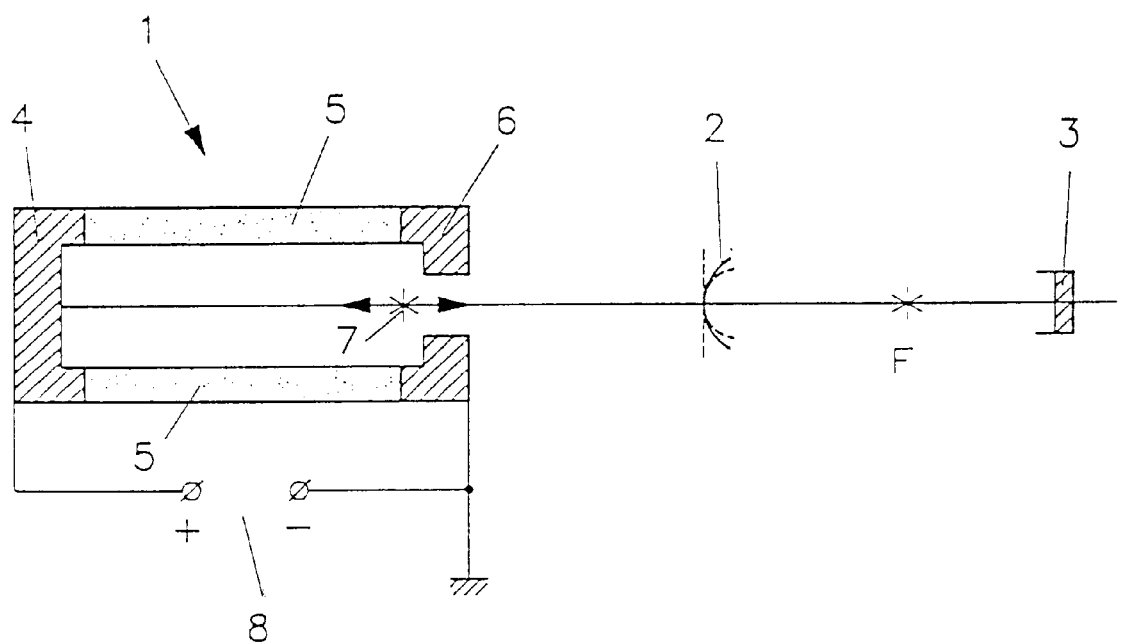
FIG. 1 a testing arrangement.

FIG. 1 illustrates the testing arrangement with the aid of which the experiments described below were performed. The testing arrangement comprises an apparatus 1 for emission of soft X-radiation, the spectrometer 2 and a PIN detector 3 (PIN-type diode) for determining the intensity of the X-radiation. In a known way, the apparatus 1 comprises an anode 4 and a cathode 6, which are separated by a dielectric 5. An adjustable high voltage 8 with $U \geq 10$ to 20 kV is applied to the anode 4 and the cathode 6. A pulsed, soft X-radiation having $E\gamma=100$ eV to 500 eV and a pulse duration of approximately 500 ns, starts from a point 7, is generated by the apparatus 1. The cathode 6 forms a screen that has a diameter of 10 mm. The point 7 is approximately 50 mm away from the screen opening. The testing arrangement is maintained at a pressure of $P \approx 10^{-3}$ mbar. The intensity of the X-radiation emitted by the apparatus 1 is a function of the material of the anode 4 and cathode 6, their geometry and the applied voltage.

A filter wafer that is available in specialty shops under the brand name "Nucleopore® Polycarbonate Membrane" is used as the spectrometer 2. The filter wafer comprises a planar disk having a diameter of 4.5 cm and a thickness of 0.01 mm. The manufacturer states that the pore diameter is 10 μm and the pore density is $1·10^5$ pores/cm². The pores represent throughgoing channels or bores. The filter wafer is arched with the aid of a holding apparatus (not shown), with the degree of arching being adjustable. In all cases, arching is effected in such a way that the filter wafer represents a continuously curved line in cross-section. Instead of a focal point, a focal "line" is attained in an arch that is circular in cross-section, the line being indicated by "F."

In order to hold the spectrometer 2, a small edge segment of the spectrometer is clamped. Moreover, the spectrometer 2 is fixed laterally by a wire strap (not shown). The edge segment opposite the clamped edge segment is held by a further wire strap that can be displaced in the direction of, the clamped edge segment with the aid of a micrometer screw, so that the spectrometer 2 can be arched to an increasing degree by the screwing in of the micrometer screw. The settings 0 mm to 8 mm can be set with the aid of the micrometer screw. The setting 8 mm corresponds to a very slightly arched spectrometer. An increasing arching of the spectrometer 2 is produced by the screwing in of the micrometer screw to the settings 7 mm to 0 mm. The spectrometer 2 assumes the most pronounced arched shape in setting 0 mm. The settings 0 mm to 8 mm of the micrometer screw are indicated by "Q" in the following intensity diagrams.

Figure 2A:
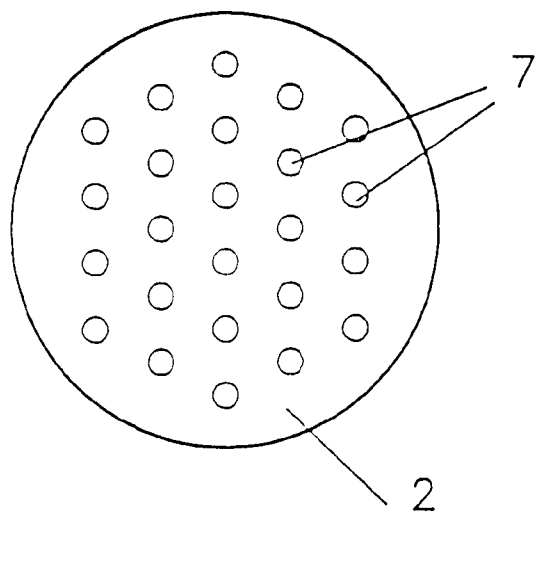
FIGS. 2a–2c schematically, the spectrometer used.
Figure 2B:
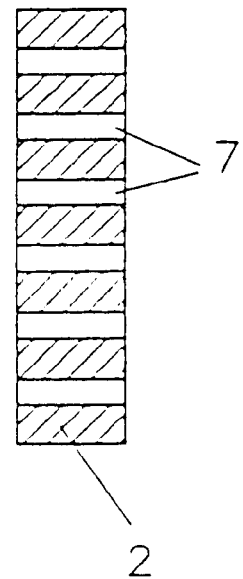
Figure 2C:
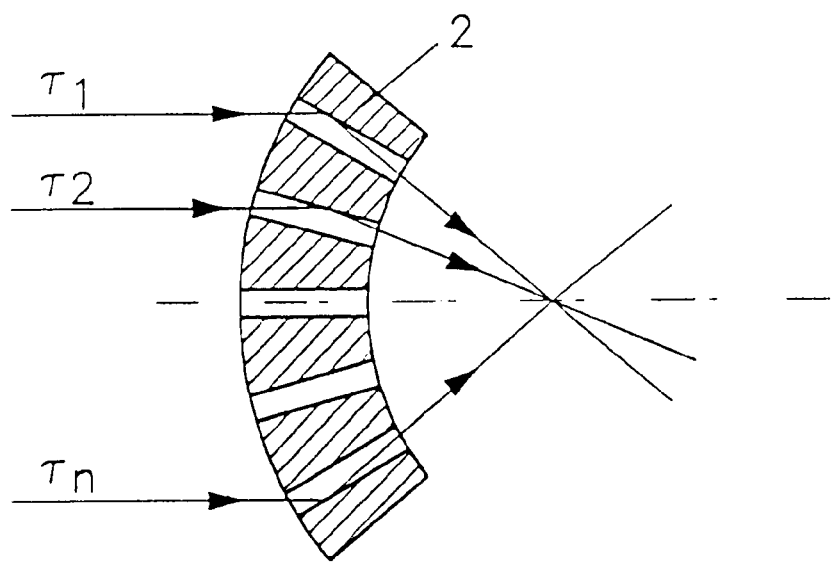

FIG. 2 schematically shows a top view (part a) of the filter wafer in planar form, a cross-sectional representation (part b) and the wafer in arched form (part c). In the optimum setting of the micrometer screw, the arching corresponds to the case cited above and illustrated in the figure (part c), namely that the arched filter wafer lies on the jacket surface of a cylinder. In the other settings a more or less pronounced arching is attained. The filter wafer is provided with a plurality of throughgoing pores or bores (channels 9). The assumed beam course of the radiation penetrating the filter wafer is illustrated in part c. A reflection of the beams which are incident from the left takes place on the inside surface of the throughgoing channels 9, with the beams being indicated by $\tau_n$ (n=1 . . . n).

Strictly speaking, the extensions or longitudinal axes of the channels do not point exactly toward the line indicated by "F", because a reflection takes place at their inside surface. In particular, with very small channel diameters the beam deviation due to the reflection can be disregarded for practical purposes. In practice, therefore, when the channel diameters are very small the beams $\tau_n$ are focussed on the common line (the cylinder axis), on which the extensions of the channels on the concave side of the filter wafer intersect. With larger channel diameters, the focal point of the radiation lies closer to the spectrometer than the point of intersection of the channel extensions because of the reflection of the radiation at the inside walls of the channels, as can be derived from part c of the figure.

The results of the experiment with the described arrangement are illustrated in the following FIGS. 3a and 3b.

FIG. 3a shows the intensities measured in [mV] with the PIN-type diode 3 as a function of the setting of the micrometer screw Q in [mm]. As mentioned, the most pronounced arching of the spectrometer 2 results at Q=0 mm and the least degree of arching results at Q=5 mm. A cathode of Cu-64 and an anode of Fe-56 were used in this experiment. The distance between the vertex point of the spectrometer 2 and the PIN-type diode 3 was 320 mm in the beam direction. The PIN-type diode supported a 5 μm thick aluminum film that is only permeable to X-radiation. The high voltage 8 was kept at U=18 kV.

Figure 3B:
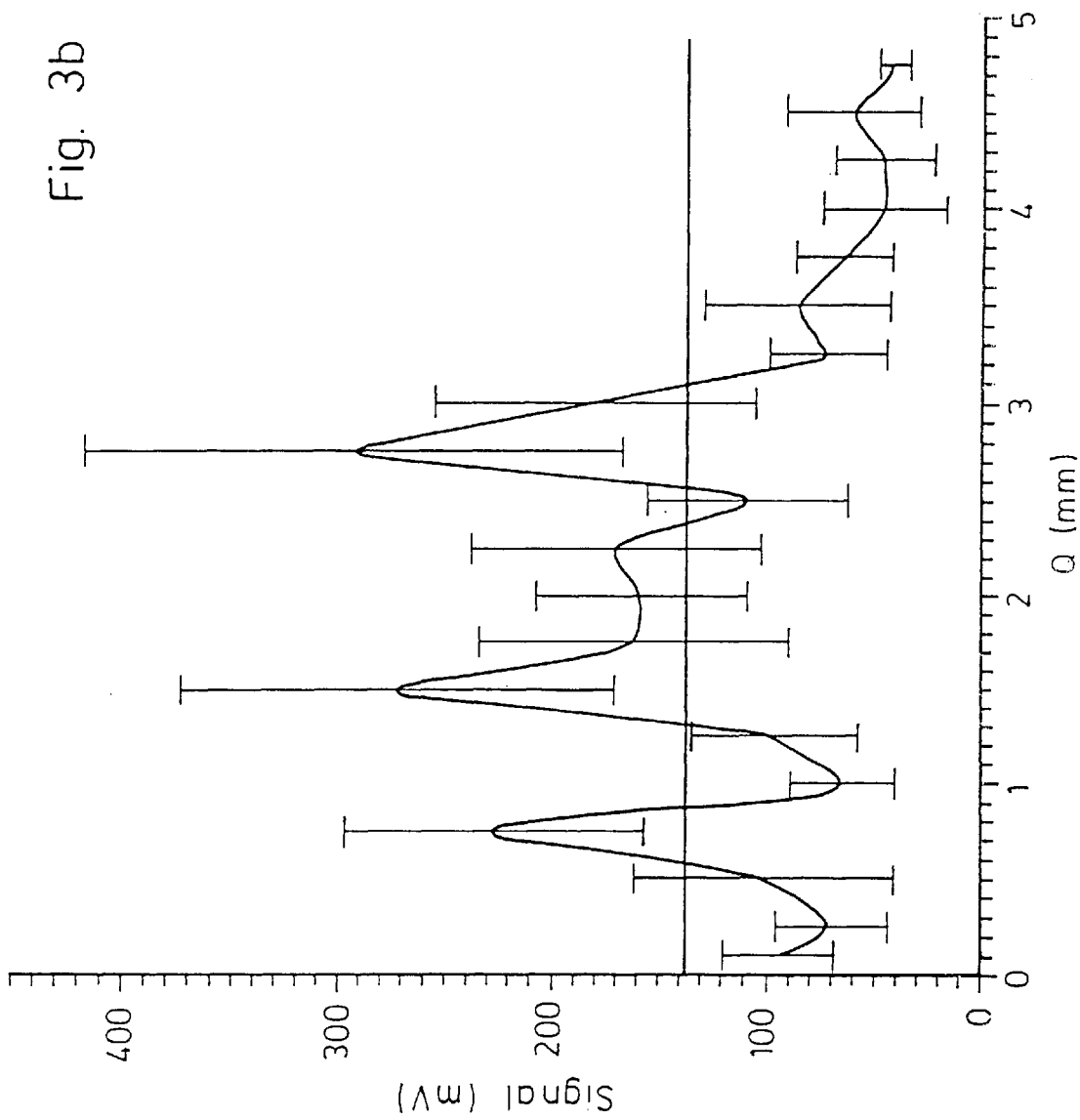

In the diagram according to FIGS. 3a and 3b, horizontal line results without spectrometer 2. In contrast, clear changes in intensity were attained with spectrometer 2. The changes in intensity are dependent on the setting Q of the micrometer screw and therefore on the arching of the spectrometer 2. In FIG. 3a the intensity values measured at the respective setting of the micrometer screw are indicated by error bars. A plurality of maxima can be seen. It is apparent that the X-radiation is bundled at individual settings of the micrometer screw and therefore influenced by the spectrometer 2. A first maximum is attained with relatively slight arching of the spectrometer 2, for example, namely at Q≈4 mm. Weaker maxima result with more pronounced spectrometer arching and correspondingly smaller settings of the micrometer screw. With slight arching (Q in a range between 5 and 4.5), the observed intensity values are below those measured without a spectrometer. This can be attributed to the absorption of the radiation by the spectrometer. Because a continuous X-ray spectrum is present, only the radiation of one wavelength range penetrates the arched disk. The maxima are interpreted as the X-ray spectrum of the X-radiation emitted by the copper cathode.

FIG. 3b shows a diagram which is analogous to FIG. 3a, with a testing arrangement that is unchanged for the most part. However, in contrast to the above-described experiment, the apparatus 1 included both an iron cathode and anode. Again, a horizontal line was attained without spectrometer 2 in the diagram. In the experiment with spectrometer 2, the attained intensities were indicated by the error bars. The focussing effect with spectrometer 2 manifests itself in the intensity maxima at a low setting Q of the micrometer screw (more pronounced arching). The low intensity values with a slightly arched spectrometer 2 again appear to be attributable to the absorption of the radiation by the spectrometer 2. A more pronounced arching (Q in a range between 1 and 3 mm) results in intensity values clearly above the intensity values obtained without spectrometer 2 (horizontal line). The maxima correspond to individual wavelength ranges; they are interpreted as the X-ray spectrum of the X-radiation emitted by the iron cathode.

What is claimed is:

1. A spectrometer for X-radiation, comprising an arched disk comprised of a material impervious to X-radiation, said disc having a convex and a concave surface, and having a plurality of through bores, each bore extending from the convex to the concave surface and having a maximum diameter of 50 $\mu$m, each bore further having a longitudinal axis that essentially points toward one of a common line and common point located opposite the concave surface; and means in engagement with said disc for altering an arching of said disc so that a distance of the common line or common point from the concave surface is changed.

2. The spectrometer defined in claim 1, wherein said bores have a maximum diameter of 10 $\mu$m.

* * * * *